June 1, 1926.
J. W. RIDGWAY
1,587,183
SPRING TESTING MACHINE
Filed Jan. 10, 1924        2 Sheets-Sheet 1
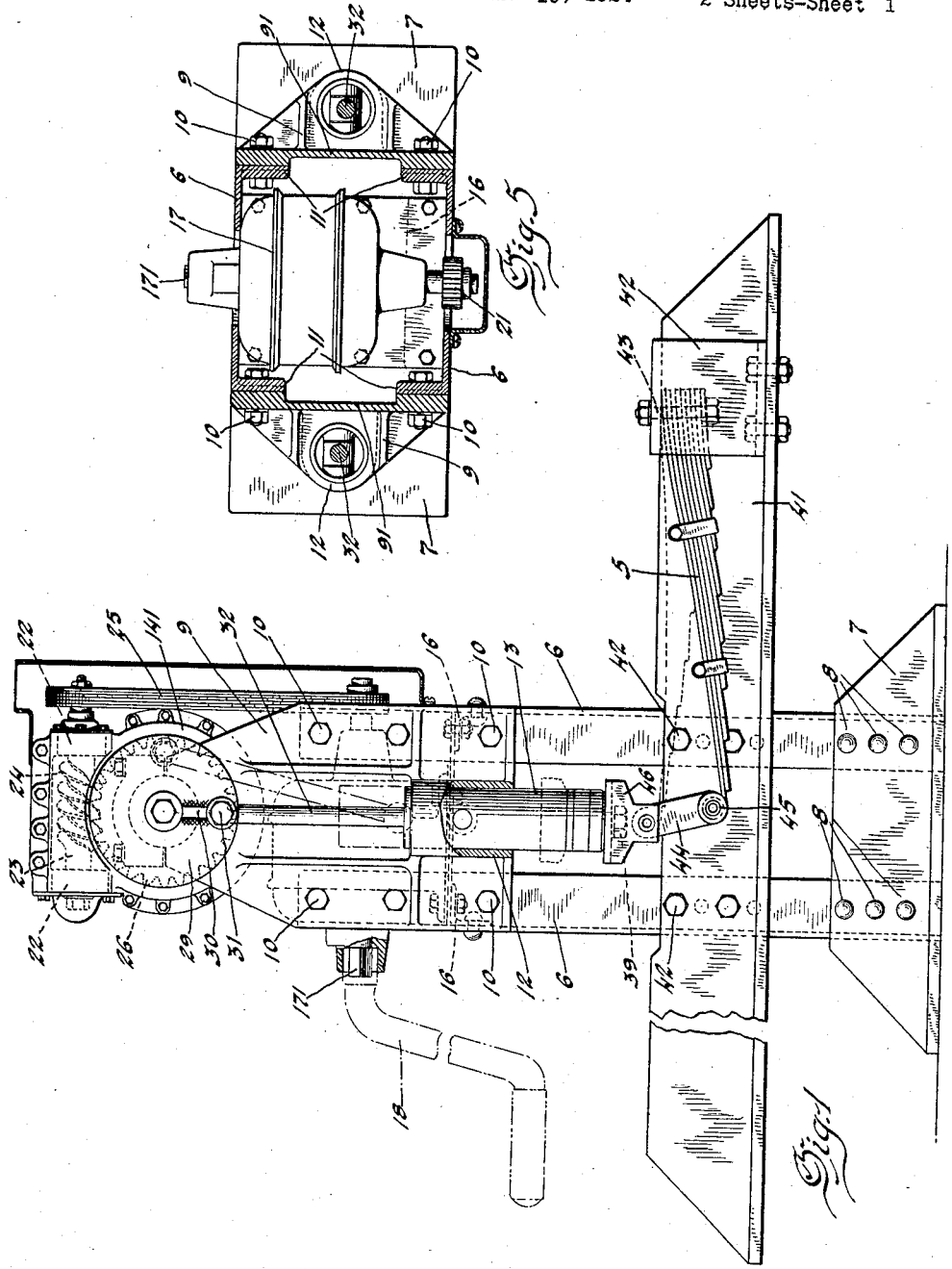
Inventor
Joseph W. Ridgway
By his Attorneys June 1, 1926.
J. W. RIDGWAY
1,587,183
SPRING TESTING MACHINE
Filed Jan. 10, 1924     2 Sheets-Sheet 2
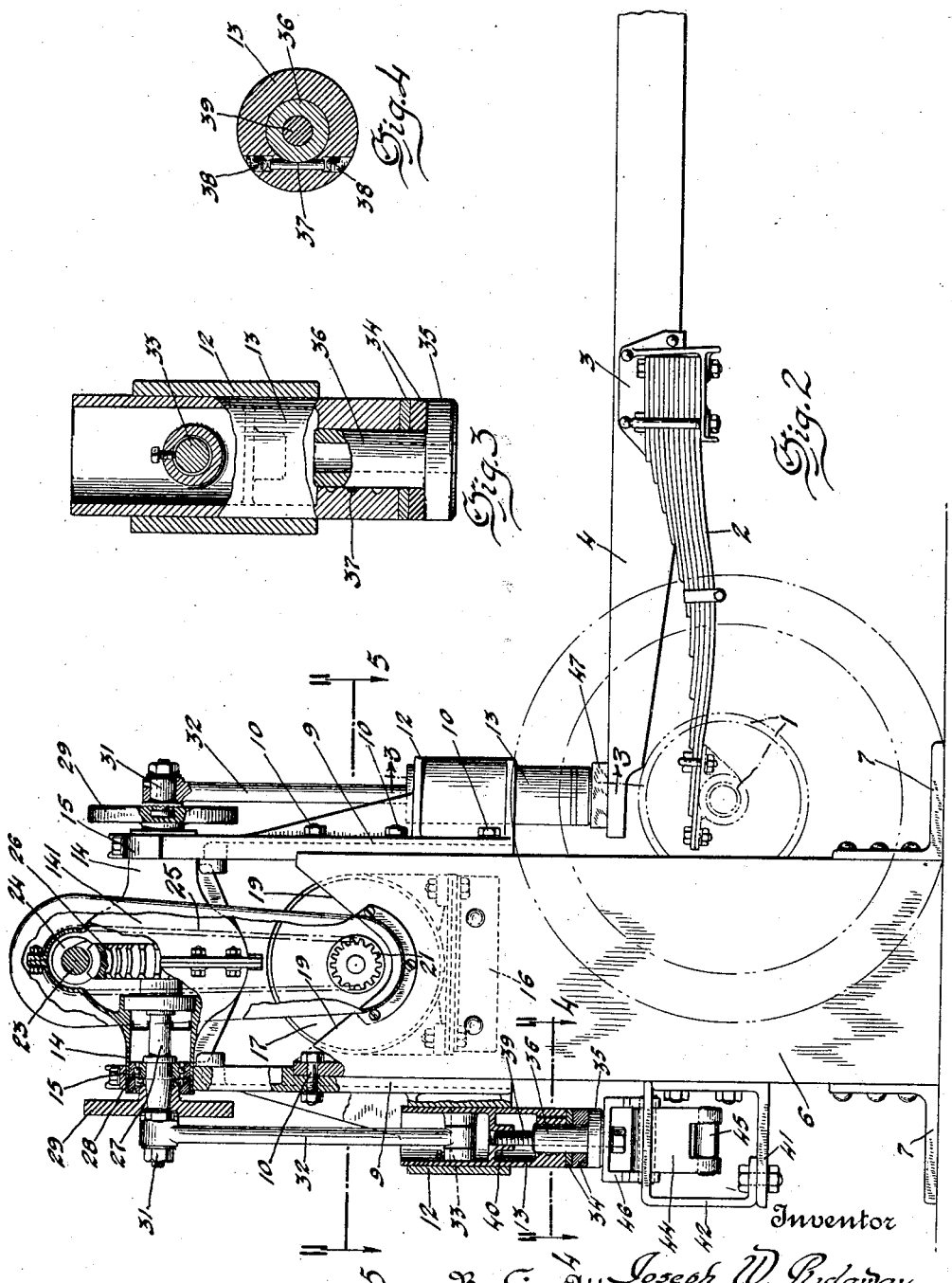

Patented June 1, 1926.

1,587,183

UNITED STATES PATENT OFFICE.

JOSEPH W. RIDGWAY, OF DETROIT, MICHIGAN, ASSIGNOR TO GENERAL MOTORS CORPORATION, OF DETROIT, MICHIGAN, A CORPORATION OF DELAWARE.

SPRING-TESTING MACHINE.

Application filed January 10, 1924. Serial No. 685,386.

My invention relates to a machine or device designed for use in testing motor driven vehicles and parts thereof, and more especially to a vibrating machine or device designed for and capable of use in testing springs for automobiles and like vehicles, for testing the chassis of the vehicle as an assembled structure, and for performing various other tests which require the subjecting of the part or device tested to a vibratory motion similar to the movement partaken of by the parts when they are in actual use. When my improved machine is in use in the manner hereinafter explained it acts to flex the spring being tested, or to move the frame of the vehicle or a portion thereof up and down in a manner similar to the way in which it moves when in actual use; during which testing operation various other parts of the chassis such as the main frame, the spring supporting brackets, the brake rods, the torque tube, the tires and various other elements of the assembled structure are caused to partake of movements similar to those which occur when the vehicle is in use.

The principal object of my invention is therefore to provide an improved testing or vibrating machine of the type and for the purpose above referred to which will be simple in construction and effective for the purpose for which it is designed, and which may be readily and cheaply constructed for the most part from standard forms and shapes of structural steel material.

With the above and other objects of invention in view my invention consists in the improved testing or vibrating machine or device illustrated in the accompanying drawings and hereinafter described and explained in detail; and in such variations and modifications thereof, within the scope of the concluding claims, as will be obvious to those skilled in the art to which my invention relates.

In the two sheets of drawings accompanying and forming a part of this specification, and wherein the preferred embodiment of my invention is illustrated:—

Figure 1 is a view showing my improved vibrating machine in end elevation for the most part; certain portions, however, being broken away to show features otherwise hidden, and the machine being shown as arranged for testing a quarter elliptic spring.

Figure 2 is a similar view showing the machine in side elevation from a position 90 degrees from the position assumed in Figure 1, the machine being set up and arranged for testing a motor vehicle chassis as an assembled structure.

Figure 3 is a fragmentary sectional view taken upon a vertical plane indicated by the line 3—3, Figure 2, looking toward the left.

Figure 4 is a fragmentary view showing a detail, the view being upon a horizontal plane indicated by the line 4—4, Figure 2, looking down.

Figure 5 is a view showing the operating motor and its relation to the other parts of the machine, the view being for the most part upon a horizontal plane indicated, approximately, by the line 5—5, Figure 2.

Referring now to the drawings wherein like parts are designated by the same reference numerals in the several views, the operating parts of my improved vibrating machine are supported from a suitable pedestal, column or frame made up of two parallel channel iron bars 6—6 spaced apart from one another and the web portions of which are of comparatively great width, and the side flanges of which are of comparatively slight extent, to thereby provide a pedestal or main frame structure having great strength for the amount of material therein, because of the large area enclosed by the peripheral wall thereof, as will be appreciated. These side bars of the pedestal or main supporting frame are connected together at their lower ends by short lengths of angle iron 7—7 which are secured to the side flanges of the frame members by rivets 8 or otherwise, and through which the machine may be fastened to the floor.

Secured to and supported from the upper ends of the frame bars 6—6 are two oppositely arranged brackets or supports 9—9 identical or substantially so in form with one another; said parts being ordinarily in the form of steel castings and the same being secured to the main frame bars by bolts 10, as many such bolts being provided as may be deemed necessary. These bolts, as will be appreciated, are spaced along the side edges of base portions 91 of the brackets and extend through the inwardly extending side webs 11—11 of the frame bar 6—6, in substantially the manner illustrated best in Figure 5 of the drawings; so that the said base portions serve as connecting members extending between the side frame members 6—6 and acting to hold them in proper relation to one another.

The supporting brackets 9—9 are suitably webbed, as shown, to thereby impart sufficient strength and stiffness thereto and to provide a proper support for the parts to be supported; and they extend above the upper ends of the side members and serve as the immediate supporting device or structure for the principal operating parts of the machine. These brackets are formed with guide portions 12—12 adjacent their lower ends shown as cylindrical in form, and within which reciprocating plungers 13—13 operate, as will hereinafter appear. The upper ends of these brackets or supports are provided with semi-circular seats within which oppositely arranged tubular end portions 14—14 of a hollow gear housing or casing 141 are supported, the housing being held in place by cap pieces 15—15 fitting over the ends of the housing, as best shown in Figure 2 of the drawing; these features providing, as will be appreciated, a construction in which the gear housing may be readily made as a separate part and then secured to the upper ends of the brackets 9—9 in assembling the machine. The housing 141 is preferably made in two like parts, as shown, for convenience in making and assembling said member and the operating parts housed therein.

Secured in place to the web portions of the main frame bars 6—6 near the upper ends thereof, and upon the inner sides of said webs, are two oppositely located angle iron motor supports 16—16; and the numeral 17 designates an electric motor of any suitable form supported by said supports, and which serves as a source of power for operating the machine. This motor may in general be of any form, except that one end of the shaft thereof is squared, as shown at 171 in Figure 1, and is adapted to receive a crank 18, indicated in dotted lines, for facilitating the turning over of the machine by hand in arranging and adjusting it relative to the part or device to be tested, as will hereinafter appear. Both ends of the motor shaft extend beyond the planes of the side members 6—6, as indicated in Figure 5, and lie within triangular cut out depressions or recesses included between the downwardly inclined free edges 19—19 of the upper ends of the webs of said side members, as best shown in Figure 2. The end of the motor shaft 20 opposite the crank 18 is provided with a driving pinion 21.

The gear housing or casing 141 hereinbefore referred to is provided with oppositely arranged bearings, the locations of which are indicated by the numerals 22—22, Figure 1, within which the ends of a worm shaft 23 having a centrally disposed worm 24 are supported, said shaft being driven from the motor pinion 21 through a suitable sprocket or silent chain 25 and a pinion of said worm shaft with which said chain engages. The worm 24 engages with a worm wheel 26 which is supported upon a plunger operating shaft 27 extending at right angles to the shaft 23; and the ends of said shaft 27 are supported in oppositely arranged bearings 28—28 held in place within the extending tubular neck portions 14—14 of the gear housing 141, these neck portions being held in the semi-circular seats at the upper ends of the brackets 9—9 by the removable caps 15—15, as above explained.

Secured to the outer ends of the plunger operating shaft 27 are crank disks 29—29 which are provided with radially extending slots, as indicated at 30, and along which slots crank pins 31—31 are adjustable; this adjustment being provided for varying the length of stroke of the plungers 13—13 hereinbefore referred to, the stroke of each plunger being variable independently of the other in the construction illustrated as will be appreciated. These crank pins serve to impart reciprocatory motion to the plungers 13—13 through connecting rods 32—32 the lower ends of which are operatively connected with the plungers 13—13 through wrist pin connections at 33—33, which may be of any appropriate form. The machine illustrated and herein described is a double machine whereby two testing operations may be carried on at the same time although the same may obviously be built as a single operation machine, one plunger 13 only being needed in that case.

The plungers 13—13 are equipped with a series of annular spacing blocks 34 at their lower ends, these blocks being of various thicknesses and as many of them being used as may be deemed desirable; the purpose of said blocks being to provide for varying the lengths of the plungers, while at the same time providing a plunger construction which will be substantially a solid structure irrespective of its length, as determined by the number and thickness of the blocks employed in any particular case. These blocks are held in place relative to the lower ends of the plungers by means of heads 35 having upwardly extending tubular shank portions 36 extending through the rings, and through an opening in the lower end of the plunger, said extending portion being held in place by a transversely extending key 37 which is forced into binding engagement therewith by means of screws 38 engaging the ends of the key in a well known way, and as indicated in Figure 4 of the drawings. When the machine is set up for use the rings 34 and head 35 are usually more securely fastened in place, and a more rigid plunger structure as a whole is provided, by the use of a binding screw or bolt 39 which extends up through a longitudinal passage in the head and in the cylindrical neck and engages a threaded opening in a cross bar 40 inside the plunger. When my improved vibrating machine is used for testing a spring in substantially the manner indicated in Figure 1 a transversely extending spring supporting table 41 made from angle iron is fastened to the side flanges of the frame bars 6—6 by suitable bolts 42, and the spring to be tested is in turn supported by said table. As a matter of course the way in which each particular spring is supported from the table will be governed, to a considerable extent, by the form of the spring to be tested; the quarter elliptic spring illustrated as supported by the table and being tested being fixedly supported at one end from a bracket 42, said fixed end being fastened to the bracket by a bolt 43 which may be of any form and which acts as a spring shackle; the bracket 42 and bolt or shackle forming in effect a structure similar to the bracket wherein the fixed end of a spring of like form is supported when the spring is in use in a motor vehicle chassis construction. The table 41 is shown as vertically adjustable by the provision of series of holes in the side flanges 11 of the frame members 6 through which the bolts 42 extend, and said table is ordinarily made long enough so that half elliptic and other type springs may be supported by it; and as a matter of fact various particular forms of table, and of bracket for supporting various forms of springs to be tested, will ordinarily be provided for use with each particular machine.

The free end of the spring 5 is connected with the lower end of the reciprocatory plunger in any suitable way as by the use of a swinging shackle 44 the lower end of which is pivotally connected with the eye of the spring being tested, as at 45, and the upper end of which is pivotally supported in a stirrup 46 the base of which is shown as fastened to the lower end of the plunger by means of the bolt 39 which holds the head 35 and rings 34 assembled with the plunger, to thereby clamp the stirrup to the lower end of the plunger and the head and spacing rings together as a single rigid structure.

When my improved testing machine is used for vibrating a motor vehicle chassis structure assembled and complete as such the table 41 is omitted, and the chassis is backed up to the machine in substantially the manner illustrated in Figure 2 of the drawings. As a matter of course the particular method whereby motion of the reciprocating plunger 13 made use of is communicated to the chassis may be varied in different cases, but in the scheme and arrangement illustrated the lower end of the plunger in question engages with a transverse bar 47 resting upon the top of the frame bars 4 of the chassis adjacent the rear end thereof. Under such conditions, and when the machine is in operation, vibratory motion will be communicated to the frame; and from the frame through the spring supporting shackles 3 and the springs 2 of the rear axle 1 of the chassis. When the parts are properly arranged and the machine is in operation the frame members will be subjected to movements of the same character as those met with in a motor vehicle when the same is in use, the springs 2 will be flexed in substantially the same manner as when the vehicle is running upon a road, and the spring supporting brackets 3 will likewise be subjected to substantially the same character of stresses as those met with in the actual operation of the vehicle.

The same remarks apply to a considerable degree with reference to the wheels and tires of the vehicle as obviously the floor or support upon which they rest forms an abutment whereby the force communicated to the chassis from the plunger is absorbed in substantially the same way as by the roadway along which it is running in the case of a vehicle in actual use. The brake and other parts of the chassis will during a testing operation partake of substantially the same motions as occur in a finished vehicle when in use; so that in addition to providing a machine whereby various parts of the chassis may be subjected to substantially the same forces as those met with in actual practice to test their endurance, the machine provides a means whereby the motions occurring in various other parts of the structure not perhaps subjected to the strains to which they are subjected in actual use, may nevertheless be studied and analyzed.

The crank 18 above referred to is for the purpose of turning the machine over by hand in setting it up for testing purposes. Inasmuch as the crank is applied to the rotating part of the machine having the highest rate of speed it is obvious that sufficient force may be applied through the crank to reciprocate the plungers and to subject the spring or other part being tested to the same force as that to which it will be subjected when the machine is in operation, although at a matter of course much more slowly. In setting up the machine it is also important to determine in advance the extent of movement communicated to the member or part being tested, as well also as the limits of movement; such movement and limits being determined by the adjustment of the stroke of the plungers 13 which is dependent upon the position of the crank pins 31 in the slots 30, by the position of the table 41, and by the arrangement of the parts to be tested relative to the machine; all of which matters, as well also as the question of proper clearance between moving parts when the machine is in operation, are commonly determined by turning the machine over slowly by hand, with the parts to be tested in place, during the setting up of the machine and before starting an actual test.

Having thus described and explained my invention I claim and desire to secure by Letters Patent of the United States:—

1. In a testing machine of the class described, a main supporting frame made up of two vertically arranged side members spaced apart from one another; two supporting brackets arranged adjacent and extending above the upper ends of said side members, and each of which has a base portion fastened to both said side members to thereby form connections between the upper ends of said members; a hollow gear housing having oppositely arranged tubular portions in line with one another; seats formed in the upper ends of said brackets and adapted to receive the ends of the tubular portions of said gear housing; means for holding said tubular portions in place within said seats; a worm shaft supported in bearings carried by said gear housing, and having a centrally arranged worm; a plunger operating shaft supported in bearings also carried by said gear casing, and which shaft extends at right angles to said worm shaft; a centrally arranged worm gear carried by said plunger operating shaft, and with which said worm meshes; vertically arranged guides carried one by each of the brackets aforesaid; reciprocating plungers operating in said guides, and with which said plunger operating shaft is operatively connected; and a motor supported between the upper ends of said side members, and which motor is operatively connected with said worm shaft.

2. In a testing machine of the class described, a main supporting frame made up of two vertically arranged side members spaced apart from one another; two supporting brackets arranged adjacent and extending above the upper ends of said side members, and each of which has a base portion fastened to both said side members to thereby form connections between the upper ends of said members; a hollow gear housing supported by and arranged between the upper ends of said brackets; a worm shaft supported in bearings carried by said gear housing, and having a centrally arranged worm; a plunger operating shaft supported in bearings also carried by said gear casing, and which shaft extends at right angles to said worm shaft; a centrally arranged worm gear carried by said plunger operating shaft, and with which said worm meshes; vertically arranged guides carried one by each of the brackets aforesaid; reciprocating plungers operating in said guides, and with which said plunger operating shaft is operatively connected; and a motor supported between the upper ends of said side members, and which motor is operatively connected with said worm shaft.

3. In a testing machine of the class described, a vertically arranged supporting frame; two supporting brackets carried by and extending above the upper end of said frame; a hollow gear housing supported by and arranged between the upper ends of said brackets; a worm shaft supported in bearings carried by said gear housing, and having a centrally arranged worm; a plunger operating shaft supported in bearings also carried by said gear casing; a centrally arranged worm gear carried by said plunger operating shaft, and with which said worm meshes; vertically arranged guides carried one by each of the brackets aforesaid; reciprocating plungers operating in said guides, and with which said plunger operating shaft is operatively connected; and a motor supported by said frame and operatively connected with said worm shaft to drive the same.

4. In a testing machine of the class described, a main supporting frame made up of two vertically arranged side members spaced apart from one another; two supporting brackets arranged adjacent and extending above the upper ends of said side members, and each of which has a base portion fastened to both said side members to thereby form connections between the upper ends of said members; a hollow gear housing supported by and arranged between the upper ends of said brackets; a worm shaft supported in bearings carried by said gear housing, and having a centrally arranged worm; a plunger operating shaft supported in bearings also carried by said gear casing; a centrally arranged worm gear carried by said plunger operating shaft, and with which said worm meshes; vertically arranged guides carried one by each of the brackets aforesaid; reciprocating plungers operating in said guides, and with which said plunger operating shaft is operatively connected; and a motor operatively connected with said worm shaft to drive the same.

5. In a testing machine of the class described, a main supporting frame; a hollow gear housing supported from and located above the upper end of said frame, and which housing is provided with two oppositely located tubular portions arranged in line with one another, said housing being supported from said frame through said tubular portions; a worm shaft supported in bearings carried by said gear housing, and having a centrally arranged worm; a plunger operating shaft supported in bearings also carried by said gear casing, and which shaft extends transverse to said worm shaft; a centrally arranged worm gear carried by said plunger operating shaft, and with which said worm meshes; vertically arranged guides supported from said frame; reciprocating plungers guided in their movement by said guides, and with which said plunger operating shaft is operatively connected; and a motor supported by said frame operatively connected with said worm shaft to drive the same.

6. In a testing machine of the class described, a main supporting frame, a hollow gear housing supported from and located above the upper end of said frame, and which housing is provided with two oppositely located tubular portions arranged in line with one another, said housing being supported from said frame through said tubular portions; a worm shaft supported in bearings carried by said gear housing, and having a centrally arranged worm; a plunger operating shaft supported in bearings also carried by said gear casing, and which shaft is located below and extends transverse to said worm shaft; a centrally arranged worm gear carried by said plunger operating shaft, and with which said worm meshes; vertically arranged guides supported from said frame; reciprocating plungers guided in their movement by said guides, and with which said plunger operating shaft is operatively connected; and a motor supported by said frame and located below said gear housing, and which motor is operatively connected with said worm shaft to drive the same.

7. In a testing machine of the class described, a vertically arranged supporting frame; a rotatable plunger operating shaft supported by said frame and located adjacent the upper end thereof; means carried by said frame for driving said shaft; a hollow cylindrical guide supported by said frame and arranged below said shaft; a reciprocating plunger operated by said shaft and fitting within and guided in its movement by said guide; a series of annular spacing members; and means for securing said spacing members to the lower end of said plunger.

8. In a testing machine of the class described, a vertically arranged supporting frame; a rotatable plunger operating shaft supported by said frame and located adjacent the upper end thereof; means carried by said frame for driving said shaft; a hollow cylindrical guide supported by said frame and arranged below said shaft; a reciprocating plunger operated by said shaft and fitting within and guided in its movement by said guide; a series of annular spacing members; a head having a tubular shank adapted to extend through said spacing members and along a passage provided in the lower end of said plunger; and a bolt extending through said shank and the upper end of which is in threaded engagement with said plunger.

9. In a testing machine of the class described, a vertically arranged supporting frame; a rotatable plunger operating shaft supported by said frame and located adjacent the upper end thereof; means carried by said frame for driving said shaft; a hollow cylindrical guide supported by said frame and arranged below said shaft; a reciprocating plunger operated by said shaft and fitting within and guided in its movement by said guide; means for varying the length of stroke of said plunger; a series of annular spacing members; means for detachably securing said members to the lower end of said plunger; and a table secured to said frame below the lower end of said plunger.

10. In a testing machine of the class described, a vertically arranged supporting frame; a rotatable plunger operating shaft supported by said frame and operatively connected with a vertically movable reciprocating plunger to operate the same; and an electric motor operatively connected with said shaft; and the shaft of which motor is so formed as to receive a crank for operating the machine manually.

11. In a testing machine of the class described, a vertically arranged supporting frame, a rotatable plunger operating shaft supported by said frame and operatively connected with a vertically movable reciprocating plunger; a worm shaft also supported by said frame; a worm upon said worm shaft meshing with a worm gear upon said first mentioned shaft to drive the same; and an electric motor carried by said frame and operatively connected with said worm shaft to drive the same, said motor having a shaft so formed as to be engaged by a crank to thereby provide for the manual operation of the machine.

In testimony whereof I affix my signature.

JOSEPH W. RIDGWAY.